United States Patent [19]
Jang et al.

[11] Patent Number: 6,013,746
[45] Date of Patent: Jan. 11, 2000

[54] PROCESS FOR CONTROLLING THE MOLECULAR WEIGHT DISTRIBUTION OF HIGH 1,4-CIS POLYBUTADIENE

[75] Inventors: Young-Chan Jang; Gwang-Hoon Kwag, both of Taejeon; Dong-Il Yoon, Cheonlanam-do; A-Ju Kim, Cheonlanam-do; Kyung-Nam Lim, Cheonlanam-do, all of Rep. of Korea

[73] Assignee: Korea Kumho Petrochemical Co., Ltd., Seoul, Rep. of Korea

[21] Appl. No.: 09/093,646

[22] Filed: Jun. 9, 1998

[30] Foreign Application Priority Data

Mar. 3, 1998 [KR] Rep. of Korea .................. 98-6930

[51] Int. Cl.$^7$ .................. C08F 4/80; C08F 36/06
[52] U.S. Cl. .................. 526/133; 526/142; 526/143; 526/213; 526/214; 526/340.4
[58] Field of Search .................. 526/133, 142, 526/143, 213, 214, 340.4

[56] References Cited

U.S. PATENT DOCUMENTS

| | | | |
|---|---|---|---|
| 3,649,605 | 3/1972 | Throckmorton | 526/340.4 X |
| 3,816,567 | 6/1974 | Yagi et al. | 526/340.4 X |
| 3,928,303 | 12/1975 | Yasui et al. | 526/340.4 X |
| 4,533,711 | 8/1985 | Takeuchi et al. | 526/340.4 |
| 5,100,982 | 3/1992 | Castner | 526/143 |
| 5,451,646 | 9/1995 | Castner | 526/137 |

*Primary Examiner*—Fred Teskin
*Attorney, Agent, or Firm*—Davidson, Davidson & Kappel, LLC

[57] ABSTRACT

This invention relates to a process for controlling the molecular weight distribution of high 1,4-cis polybutadiene and more particularly, to a process of easily controlling the molecular weight distribution of polybutadiene which is concerned directly with the physical properties such as processability, in such a manner that preparation of high 1,4-cis polybutadiene is made available via polymerization of 1,3-butadiene in the presence of Ziegler-Natta catalyst, adding carboxylic acid represented by following formula I for the controlling of the molecular weight distribution of polybutadiene based on the contents of carboxylic acid, may be easily controlled, without any alternation in the 1,4-cis contents.

Formula I

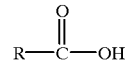

Wherein R is selected from the group consisting of alkyl, cycloalkyl and arylalkyl groups substituted or unsubstituted with at least one or more halogen atoms, or alkyl, cycloalkyl and arylalkyl groups with at least one or more double bonds containing from 5 to 20 carbon atoms.

5 Claims, No Drawings

PROCESS FOR CONTROLLING THE MOLECULAR WEIGHT DISTRIBUTION OF HIGH 1,4-CIS POLYBUTADIENE

FIELD OF THE INVENTION

This invention relates to a process for controlling the molecular weight distribution of high 1,4-cis polybutadiene and more particularly, to a process of easily controlling the molecular weight distribution of polybutadiene which is concerned directly with the physical properties such as processability, in such a manner that preparation of high 1,4-cis polybutadiene is made available via polymerization of 1,3-butadiene in the presence of Ziegler-Natta catalyst, adding carboxylic acid for the controlling of the molecular weight distribution of polybutadiene based on the contents of carboxylic acid, may be easily controlled, without any alternation in the 1,4-cis contents.

BACKGROUND OF THE INVENTION

According to the conventional method of controlling the molecular weight distribution of high 1,4-cis polybutadiene (hereinafter referred to as "high-cis BR"), a method of using organonickel compound, organoaluminum compound and fluorine containing compound as a main catalyst, together with halogen-substituted phenol derivatives as an additive, was disclosed in the U.S. Pat. No. 5,100,982.

The U.S. Pat. No. 5,451,646 also disclosed a method of using organonickel compound, organoaluminum compound and fluorine containing compound as a main catalyst, together with p-styrenated diphenyl amine to control the molecular weight of the high-cis BR, thereby improving the processability.

Further, the Japanese Patent No. 78-51,286 disclosed a method of preparing the high-cis BR with a narrow range of molecular weight distribution using nickel compound, boron compound, alkyllithium and alkylbenzene sulfonate.

In addition, the U.S. Pat. No. 4,533,711 disclosed a method of further extending the molecular weight distribution, wherein rare earth metal compound belonging to the atomic number of 57 to 71, organoaluminum compound and halogenated aluminum compound were employed as a main catalyst, while using organoaluminum hydrides or hydrocarbons compounds containing activated hydrogen as an additive.

However, the conventional methods of controlling the molecular weight distribution in preparing the high-cis BR have affected the main physical properties of polymer such as solution viscosity and Mooney viscosity, thus resulting in increasing cold-flow.

SUMMARY OF THE INVENTION

To overcome the controlling-related problems of molecular weight distribution involved in the conventional methods when the high-cis BR is prepared, an object of this invention is to provide a process of controlling the molecular weight distribution of high-cis BR.

Therefore, this invention has recognized some advantages in that without any alternation of atoms in the active site, the addition of carboxylic acid makes it easier to control the molecular weight distribution of the high-cis BR, thus optimizing the processability and physical properties of rubber.

This invention, which is a process for controlling the molecular weight distribution of high-cis BR, is characterized in that carboxylic acid, as shown in the following formula I, is added in the above process of preparing high-cis BR via polymerization of 1,3-butadiene in the presence of catalyst.

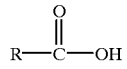

Formula I wherein R is selected from the group consisting of alkyl, cycloalkyl and arylalkyl groups substituted or unsubstituted with at least one or more halogen atoms, or alkyl, cycloalkyl and arylalkyl groups with at least one or more double bonds containing from 5 to 20 carbon atoms.

DETAILED DESCRIPTION OF PREFERRED EMBODIMENTS

This invention is described in more detail as set forth hereunder.

This invention relates to a process for controlling the molecular weight distribution which may affect the processability of rubber followed by the control of the catalyst activity with the addition of carboxylic acid.

In particular, the molecular weight distribution of high-cis BR may be controlled without alternation of atoms in the active site or catalyst ratio.

As with some physical properties (e.g., average molecular weight, density, short chain branch and long chain branch), the molecular weight distribution demonstrates a physical, mechanical and rheological property of polymer, which may be represented by a ratio of weight-average molecular weight to number-average molecular weight.

Typically, some polymers with a wide range of molecular weight distribution have better processability, since good fluidity in the melting state makes it easier to effectuate the processing.

By contrast, some polymers with a narrow range of molecular weight distribution have better space stability, since the anti-impact from the outside and tensile strength prove to be excellent.

In consideration of the above points, if the priority is given in processability during the manufacturing process of tire, a rubber with somewhat wide range of a molecular weight distribution and not-too-large molecular weight is preferable.

However, if some physical properties such as impact or tensile strength are required, a linear rubber with a narrow range of molecular weight are rather preferred.

Since carboxylic acid, a modulator of molecular weight distribution according to this invention, requires a good solubility to nonpolar solvents for polymerization, some organic acids containing from 5 to 20 carbon atoms is preferable; namely, a compound represented by the above formula I.

If the amount of carboxylic acid is increased, the high-cis BR with a narrow range of a molecular weight distribution is obtained.

This means that if the amount of carboxylic acid is increased, the active site on catalyst will be similar to one another.

The similarity in the active site on catalyst provides some polymers with similar molecular weights, thus narrowing a molecular weight distribution.

If the high-cis BR is prepared by controlling the amounts of carboxylic acid according to this invention, its weight-average molecular weight may be approximately controlled in the range of 50,000 to 600,000.

In consequence, the molecular weight distribution may be adjusted up to the range of 2.5 to 6.0.

To meet such requirements, the amount of carboxylic acid per 1 mole of organonickel compound, a main catalyst, is adjusted in a molar ratio of 0.1 to 8.

If the molar ratio of such amount is less than 0.1 per 1 mole of nickel catalyst, the effects of controlling the molecular weight distribution are reduced but in case of exceeding the molar ratio of 8, the polymerization yield results in declining significantly.

The catalyst system used for the preparation of the high-cis BR according to this invention is a commonly available Ziegler-Natta catalyst, comprising organonickel compound, boronfluoride complex and organoaluminum compound.

Hence, as for the organonickel compounds, carboxylic compounds having a good solubility to nonpolar solvents are preferable; for example, such compounds include nickel naphthenate, nickel octoate or nickel styerate, etc., preferably containing 16 carbon atoms or more.

The complex of boron compound, a component of boronfluoride complex, is selected from the following groups: ethers, ketones and esters: the ethers includes dimethylether, diethylether, dibutylether, tetrahydrofuran, dihexylether, dioctylether or methyl t-butylether, the ketones includes acetone, methylethylketone, cyclohexanone, methylisoamylketone, 2-heptanone; the esters includes methyl acetate, ethyl acetate, butyl acetate, methyl pyruvate, ethyl pyruvate, methyl methoxypropionate or ethyl ethoxypropionate.

The commonly available organoaluminum compound is employed, which is represented by the following formula II.

Formula II

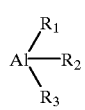

Wherein $R_1$, $R_2$ and $R_3$ are selected from the group consisting of allyl, cycloalkyl, aryl, arylalkyl, alkoxy groups containing from 1 to 10 carbon atoms, or hydrogen atom; and $R_1$, $R_2$ and $R_3$ can be the same or different.

The organoaluminum compound includes trimethylaluminum, triethylaluminum, tripropylaluminum, triisobutylaluminum, or trihexylaluminum.

In line with the process of ageing Ziegler-Natta catalyst, it is prerequisite that the solvents designed to prepare the catalyst be the ones with no reactivity with the catalyst; for examples, toluene is the best choice but cyclohexane, hexane, or heptane may be used if the complex of boron compound is ether and with carbon number of more than 4.

It is preferred that the mixing ratio of each catalyst in Ziegler-Natta catalyst is determined as follows: the molar ratio between organoaluminum compound and nickel compound (Al:Ni) is 1:1 to 20:1; the molar ratio between boronfluoride complex and organoaluminum compound is 0.7:1 to 3:1; the molar ratio between boronfluoride complex and nickel compound is 1:1 to 30:1. The sequential input order of each catalyst for the ageing of a desired catalyst is as follows: a light-green colored nickel catalyst solution (in toluene) containing 1,3-butadiene is charged to a catalyst reactor under the nitrogen atmosphere and then, boronfluoride complex and organoaluminum compound are introduced.

Since the sequential input order of each catalyst significantly affect the nature of the high-cis BR as a final product, extreme caution should be exercised in observing such sequential input order.

Meanwhile, the temperature and time related to ageing of the catalyst also affect the nature of the high-cis BR as a final product; the appropriate ageing time ranges from 5 minutes to 2 hours, while the ageing temperature is desirably in the range of −20 to 60° C.

Then, a mixture of 1,3-butadiene and Ziegler-Natta catalyst, so prepared, is mixed with a polymerization solvent to initiate polymerization.

Hence, since the polymerization solvent in polymerization affects the polymer, its use should be made in the state where oxygen and water are removed.

It is preferred that polymerization solvents used for this invention include nonpolar solvent such as cyclohexane, heptane, hexane, petroleum ether, benzene, toluene and xylene, etc.

The polymerization is initiated under a high-purity nitrogen atmosphere, preferably at the reaction temperature range from room temperature to 100° C., appropriate catalyst and desired 2-hour polymerization time condition to attain the yield of more than 90%.

After the reaction is completed, reaction terminators (e.g., polyoxyethyleneglycol ether organoposphate) and 2,6-di-t-butyl-p-cresol are added to the reaction mixture, followed by precipitation in methyl alcohol or ethyl alcohol to obtain a final product.

This invention is explained based on the following examples in more detail as set forth hereunder but is not limited by these examples.

Hence, the molecular weight distribution (Mw/Mn) is represented by a ratio of weight-average molecular weight (Mw) to number-average molecular weight (Mn), being measured by gel permeation chromatography (Shodex Co.).

EXAMPLE 1

Ziegler-Natta catalysts used for this reaction included nickel octoate[in 0.05% toluene solution, which does not contain carboxylic acid (OMG Co. of U.S.A.)], borontrifluoride butylether (in 1.5% toluene solution) and triethylaluminum (in 0.8% toluene solution).

A nickel catalyst of $6.81 \times 10^{-5}$ mole per 100 g of monomer was employed.

The reaction catalyst was aged in such a manner that a) a 100 mL round-bottomed flask was sufficiently purged with nitrogen and was sealed tightly with rubber stopper, and b) nickel octoate, borontrifluoride butylether, and triethylaluminum were sequentially charged to the 100 mL round-bottomed flask in a molar ratio of 1:10:5, respectively, which was then reacted at 20° C. for 1 hour prior to use.

The polymerization was performed in such a manner that: a 1 L pressure reactor was sufficiently filled with nitrogen; as shown in the following table 1, a mixture of polymerization solvent as prepared by mixing cyclohexane and heptane in a ratio of 9:1 by weight, 2-ethylhexanoic acid, Ziegler-Natta catalyst, so aged above, and 1,3-butadiene monomer were added to the reactor and reacted at 60° C. for 2 hours, while altering 2-ethylhexanoic acid content; hence, the ratio of polymerization solvent and monomer was 5:1 and then, 2,6-di-t-butyl-p-ceresol, polyoxyethylene phosphate and ethanol was introduced to the reaction mixture to complete the reaction.

TABLE 1

| catalyst | molar ratio of catalyst | (1) | MWD (2) | 1,4-cis content (%) | solution viscosity (cps) |
|---|---|---|---|---|---|
| 1 nickel octoate/ borontrifluoride butylether/ triethylaluminum | 1/10/5 | 0.14 | 3.45 | 96.9 | 205 |
| 2 | | 2 | 3.38 | 97.2 | 283 |
| 3 | | 4 | 3.30 | 97.3 | 246 |
| 4 | | 6 | 2.88 | 97.3 | 205 |

Notes.
(1) Content of 2-ethylhexanoic acid (per 1 mole of nickel catalyst)
(2) Molecular weight distribution

EXAMPLE 2

In a same procedure as described in the example 1, high-cis BR was prepared except the fact that 2-bromooctanoic acid was employed as a modulator for the molecular weight distribution and its contents were controlled, as shown in the following table 2.

TABLE 2

| catalyst | molar ratio of catalyst | (1) | MWD (2) | 1,4-cis content (%) | solution viscosity (cps) |
|---|---|---|---|---|---|
| 1 nickel octoate/ borontrifluoride butylether/ triethylaluminum | 1/10/5 | 1 | 3.43 | 96.8 | 201 |
| 2 | | 2 | 3.29 | 97.0 | 181 |
| 3 | | 3 | 2.90 | 97.0 | 183 |
| 4 | | 4 | 2.63 | 97.3 | 167 |
| 5 | | 5 | 2.53 | 97.3 | 190 |

Notes.
(1) Content of 2-bromohexanoic acid (per 1 mole of nickel catalyst)
(2) Molecular weight distribution

EXAMPLE 3

In a same procedure as described in the example 1, high-cis BR was prepared except the fact that 2-octenoic acid was employed as a modulator for the molecular weight distribution and its contents were adjusted, as shown in the following table 3.

TABLE 3

| catalyst | molar ratio of catalyst | (1) | MWD (2) | 1,4-cis content (%) | solution viscosity (cps) |
|---|---|---|---|---|---|
| 1 nickel octoate/ borontrifluoride butylether/ triethylaluminum | 1/10/5 | 1 | 3.61 | 96.7 | 228 |
| 2 | | 3 | 3.17 | 97.2 | 248 |
| 3 | | 4 | 3.03 | 97.5 | 310 |
| 4 | | 5 | 3.01 | 97.5 | 352 |
| 5 | | 6 | 2.53 | 97.7 | 469 |

Notes.
(1) Content of 2-octenoic acid (per 1 mole of nickel catalyst)
(2) Molecular weight distribution Comparative Example 1 to 8

In a same procedure as described in the example 1, high-cis BR was prepared except the fact that as shown in the following table 4, the catalyst composition was amended in the absence of carboxylic acid as a modulator for the molecular weight distribution.

TABLE 4

| catalyst | molar ratio of catalyst | MWD | solution viscosity (cps) |
|---|---|---|---|
| 1 nickel naphthenate/ borontrifluoride butylether/ triethylalumium | 1/7.5/9 | 5.01 | 1134 |
| 2 | 1/7.5/7.5 | 5.68 | 1976 |
| 3 | 1/7.5/6 | 2.99 | 784 |
| 4 | 1/7.5/4.5 | 4.32 | 400 |
| 5 | 1/7.5/3 | 2.20 | 218 |
| 6 nickel naphthenate/ borontrifluoried ethylether/ triethylaluminum | 1/15/6 | 3.87 | 146 |
| 7 | 1/12.5/6 | 4.27 | 261 |
| 8 | 1/10/6 | 4.73 | 546 |

From the results of the table 4, it is revealed that if the molecular weight distribution was controlled based on the changes in the contents of catalyst in the absence of carboxylic acid, significant alternations in the values of solution viscosity were observed.

By contrast, this invention is characterized in that without altering the composition ratio of Ziegler-Natta catalyst, controlling in the molecular weight distribution can be easily achieved via simple controlling in the contents of carboxylic acid, while having no significant influence on the physical properties such as solution viscosity, etc.

As described in the above in more detail, when high-cis BR is prepared via polymerization of 1,3-butadiene in the presence of some catalyst according to this invention, a method of controlling the molecular weight distribution with the addition of carboxylic acid has an advantage in that without changing atoms at the active site, controlling in the molecular weight distribution can be easily achieved with the addition of carboxylic acid, thus guaranteeing the optimum processability and physical properties of rubber.

What is claimed is:

1. A process for controlling the molecular weight distribution of high 1,4-cis polybutadiene comprising the step of employing a carboxylic acid represented by the following Formula I as a regulator of molecular weight distribution in the polymerization of 1,3-butadiene in the presence of Ziegler-Natta catalyst comprising a) organonickel compound, b) borontrifluoride complex and c) organoalkylaluminum compound, Formula I being represented as follows:

Formula I

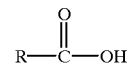

wherein R is selected from the group consisting of alkyl, cycloalkyl and arylalkyl groups with or without at least one or more double bonds containing from 6 to 20 carbon atoms.

2. A process according to claim 1, wherein the molar ratio of the carboxylic acid to said organonickel compound is 0.1 to 8:1.

3. A process according to claim 1, wherein said organonickel compound is employed by selecting one or more compounds from the following groups: nickel naphthenate, nickel octoate and nickel stearate.

4. A process according to claim 1, wherein said organoalkylaluminum compound is employed by selecting one or more compounds from the following groups: trimethylaluminum, triethylaluminum, tripropylaluminum, tributylaluminun, triisobutylaluminum and trihexylaluminum.

5. A process according to claim 1, wherein said borontrifluoride complex is selected from the group consisting of: borontrifluoride dimethylether, borontrifluoride diethylether, borontrifluoride dibutylether, borontrifluoride tetrahydrofuran, and combinations thereof.

* * * * *